United States Patent
Rohrbach et al.

[15] 3,678,773
[45] July 25, 1972

[54] VARIABLE SPEED DRIVE

[72] Inventors: Royal E. Rohrbach, Bessemer; Royce W. Ray, Leeds, both of Ala.

[73] Assignee: Fitness Industries, Inc.

[22] Filed: Dec. 22, 1970

[21] Appl. No.: 100,753

[52] U.S. Cl. ................................74/230.17 A, 74/849
[51] Int. Cl. ..................................................F16h 55/52
[58] Field of Search ............74/230.17 A, 230.17 C, 849

[56] References Cited

UNITED STATES PATENTS

| | | | |
|---|---|---|---|
| 3,064,486 | 11/1962 | Aplin | 74/230.17 C |
| 2,215,831 | 9/1940 | Heyer | 74/849 |
| 2,927,571 | 3/1960 | Kamlukin | 74/849 |
| 3,156,127 | 11/1964 | Pettigrew | 74/230.17 C |

OTHER PUBLICATIONS

Product Engineering, page 52, April 10, 1961.

Primary Examiner—C. J. Husar
Attorney—Jennings, Carter & Thompson

[57] ABSTRACT

A variable speed drive comprising a drive motor mounted in a frame for pivotal movement by means of a reversible motor and screw drive unit operatively connected to the drive motor. A shaft to be driven is mounted parallel to the shaft of the drive motor and power is transmitted from the drive motor to the shaft to be driven through a belt and variable speed pulley, preferably of the type in which the diameter of the pulley decreases as the motor shaft is moved away from the shaft to be driven, and vice versa.

2 Claims, 3 Drawing Figures

Patented July 25, 1972
3,678,773
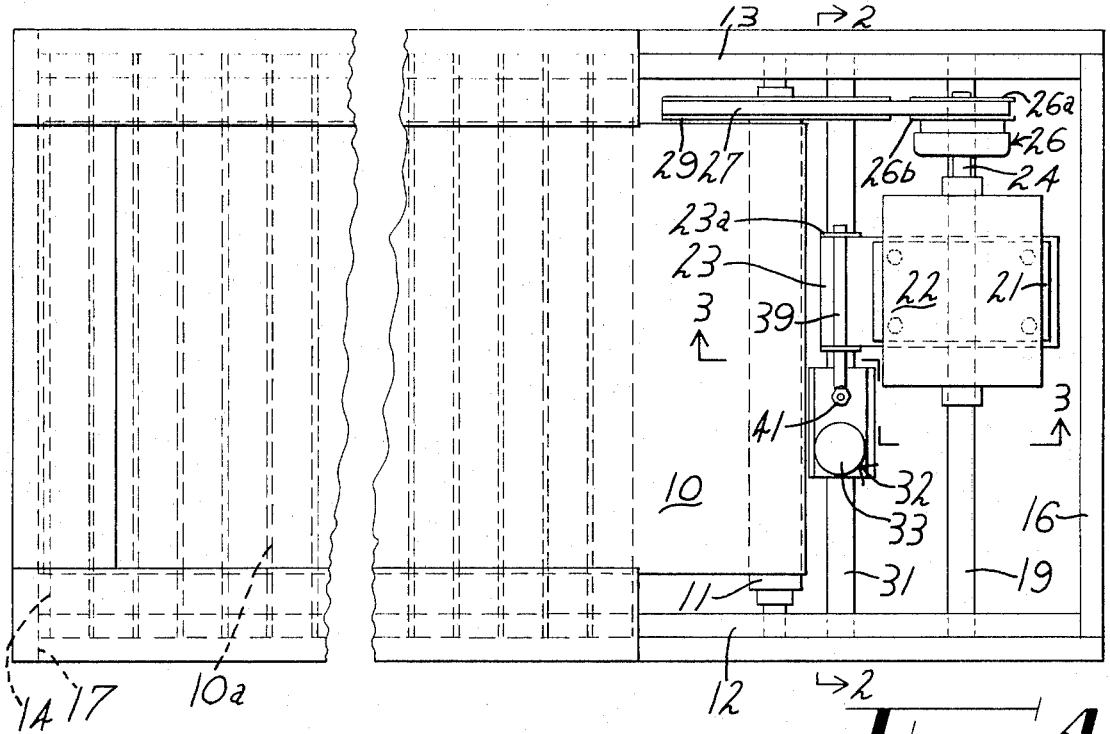
Fig 1.
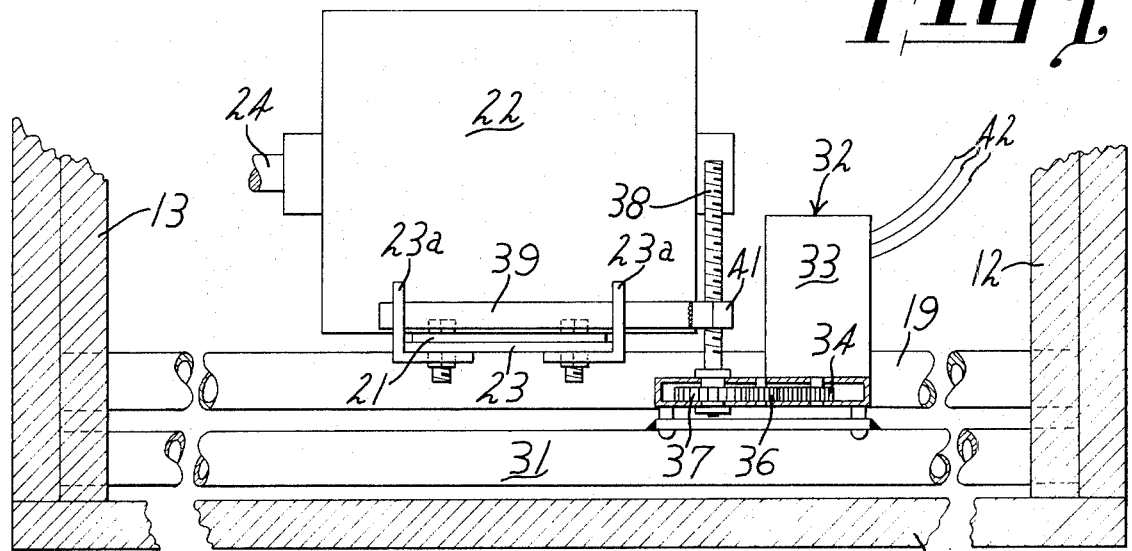
Fig 2.
Fig 3.
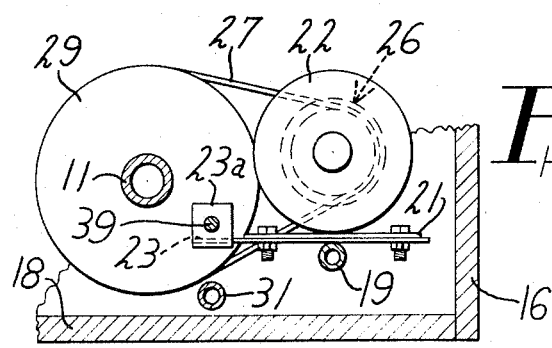
INVENTORS
Royal E. Rohrbach
Royce W. Ray
BY
Jennings Carter & Thompson
Attorneys

VARIABLE SPEED DRIVE

Our invention relates to a variable speed drive and has for an object the provision of a simple, effective and trouble free drive for shafts which generally stated embodies a drive motor having an output shaft, a variable speed pulley on the drive shaft, and means to mount the motor for tilting or rocking movement relative to the shaft to be driven, whereby as the drive motor is rocked its shaft carrying the pulley moves away from the shaft to be driven, thus decreasing the effective diameter of the pulley on the drive motor shaft, decreasing the speed of the shaft to be driven, and vice versa.

Another object is to provide apparatus of the character designated in which a reversible electric motor and screw drive mechanism is provided to rock the motor, thus to vary the speed of the shaft to be driven, the screw drive unit itself being mounted on a shaft located between a shaft supporting the drive motor and the shaft to be driven, thus resulting in a compact, efficient variable speed drive.

Another object is to provide apparatus of the character designated which is particularly adapted for driving the treadmill belt of exercising devices and the like, it being thus possible to provide a simple electrical switch, in reach of the person using the exercising device, to actuate the reversible motor for the screw drive unit in either direction, thereby to vary the speed of the treadmill belt.

Apparatus illustrating features of our invention is shown in the accompanying drawing forming a part of this application in which:

FIG. 1 is a detail fragmental plan view with certain parts broken away;

FIG. 2 is an enlarged detail fragmental sectional view taken generally along line 2—2 of FIG. 1; and, FIG. 3 is a detail sectional view taken generally along line 3—3 of FIG. 1.

Referring now to the drawing for a better understanding of our invention we show the same in association with a treadmill belt indicated generally at 10. A plurality of closely spaced rollers 10a may support the belt along its length. The belt, at the forward end, may pass over a roller 11 which is journaled in side frame members 12 and 13. At its rear the belt passes over a shaft 14 also journaled in the side frame members. The frame member may also comprise end walls 16 and 17 and for the purpose of completing the unit, a bottom wall 18.

Mounted adjacent the forward end of the open, box-like frame is a shaft 19 which is mounted for rocking movement in the walls 12 and 13. The shaft 19 may be a hollow tube member or may be solid as desired. Secured to the shaft 19 in any suitable manner is the base 21 of the drive motor 22. The base has an extending portion 23 with upturned ears 23a thereon. The extension 23 extends toward the shaft to be driven, namely, shaft 11.

The motor 22 has an output shaft 24 on which is mounted a variable speed pulley indicated generally by the numeral 26. While the pulley 26 may be one of several which are available on the market, we prefer to use one which is manufactured by the Hi-Lo Manufacturing Company of Minneapolis, Minnesota. As is known, this pulley is of the type in which the outer half 26a is spring biased toward the inner half 26b so that when the V-belt 27 is tensioned more than a given amount, these halves 26a and 26b move axially apart, decreasing the effective diameter of the pulley 26. In this way the variable speed is obtained.

Secured to the shaft 11 is a V-belt pulley 29, and the belt 27 passes over the pulleys 26 and 29.

Mounted in the side frames 12 and 13 for rocking movement, and located between the shafts 19 and 11 is another shaft 31. Secured to this shaft 31 is a reversible motor and screw drive unit indicated generally by the numeral 32. The motor portion 33 drives a small gear 34 which through reduction gears 36 finally drives a gear 37 fast on the lower end of an adjusting screw 38.

Passing laterally through the ears 23a of the motor mount extension is a pin 39 which carries a threaded nut 41, in engagement with screw 38.

From what has been described it is now possible more fully to explain and understand our invention and the advantages thereof. With the parts assembled as indicated in the drawings it will be seen that by rocking the base of the motor, namely, by moving it up and down by means of the nut 41 and screw 38, the motor shaft 24 moves toward and from the shaft to be driven, namely, shaft 11. This is accomplished by supplying electrical energy, selectively, through leads 42 to the reversible motor 33, thus to rotate the screw 38 in the desired direction, whereby the nut causes the shaft 19 carrying the motor 22 to rock, moving the shaft 24 either toward or from the shaft 11. Also, it will be noted that the shaft 31 to which the unit 32 is affixed also is mounted to rock, thus to compensate for the change in angle as the nut moves upwardly, it being also understood that the pin 39 is rotatable in the ears 23a of the motor mount. If it is assumed that the parts are generally in the position of FIG. 2, with the shaft 24 moved fairly close to pulley 29 on shaft 11, and it is desired to decrease the speed, the motor 33 is energized in a direction to raise the nut 41 and hence to pivot the entire motor 22 in a direction to move the pulley 26 away from the pulley 29. Due to the variable action of pulley 26 the parts 26a and 26b separate from each other, thus decreasing the effective diameter of the pulley 26, resulting in a decrease in speed of shaft 11. Reverse movement of the screw 38 of course permits the effective diameter of the pulley 26 to increase, increasing the speed of shaft 11.

In view of the foregoing it will be seen that we have devised an improved, simple and efficient variable speed drive for devices such as belts of treadmills for exercising purposes and the like. It will be noted that by placing the shaft 31 between shafts 19 and 11, we have greatly decreased the overall length of the apparatus and yet have maintained in every way the effectiveness of the speed control. In actual practice our invention has proven to be extremely practical and satisfactory and as stated by the provision of a simple switch control, not shown, for the motor 33, the treadmill user can vary the speed at will, without having to stop the apparatus.

While we have shown our invention in but one form, it will be obvious to those skilled in the art that it is not so limited, but is susceptible of various other changes and modifications without departing from the spirit thereof.

What we claim is:

1. In a variable speed drive,
   a. a drive motor having an output shaft,
   b. a shaft to be driven mounted for rotation and spaced from the motor and generally parallel to the shaft of the motor,
   c. a shaft parallel to the shaft of the drive motor on which the drive motor is mounted,
   d. means mounting the shaft on which the motor is mounted for rocking movement whereby the motor shaft may be moved toward and from the shaft to be driven,
   e. a reversible motor and screw drive unit operatively connected to the drive motor for rocking it so as to move its shaft toward and from the shaft to be driven,
   f. a second shaft on which the reversible motor and drive screw unit is mounted, said second shaft being rotatably mounted and parallel to the shaft on which the drive motor is mounted and being located between the shaft supporting the drive motor and the shaft to be driven, and
   g. a variable diameter driving connection between the drive motor shaft and the shaft to be driven, whereby moving the drive motor shaft toward the shaft to be driven increases the diameter of the driving connection and hence increases the speed of rotation to the shaft to be driven, and vice versa.

2. Apparatus as defined in claim 1 in which the drive motor is mounted on a base, said base being mounted on said shaft which mounts the motor, said base having a forwardly extending portion, and a threaded driving connection for the screw of the screw drive unit connected to the forward extension of the motor base, whereby as the screw rotates the extension is moved up and down, thereby to rock the drive motor shaft toward and from the shaft to be driven.

* * * * *